Figure 6:
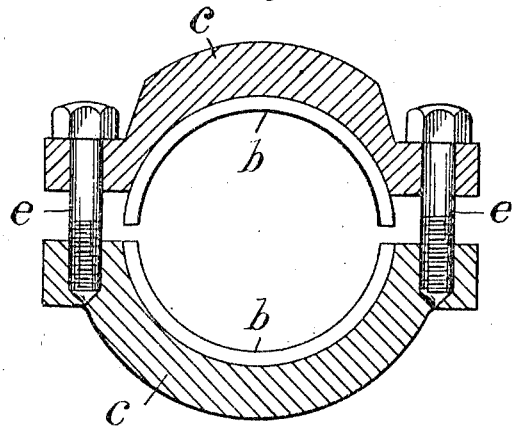

C. I. SHIRLEY & C. S. LOCKWOOD.
JOURNAL SLEEVE FOR ROLLER BEARINGS.
APPLICATION FILED JUNE 27, 1908.
964,322.
Patented July 12, 1910.
2 SHEETS—SHEET 1.
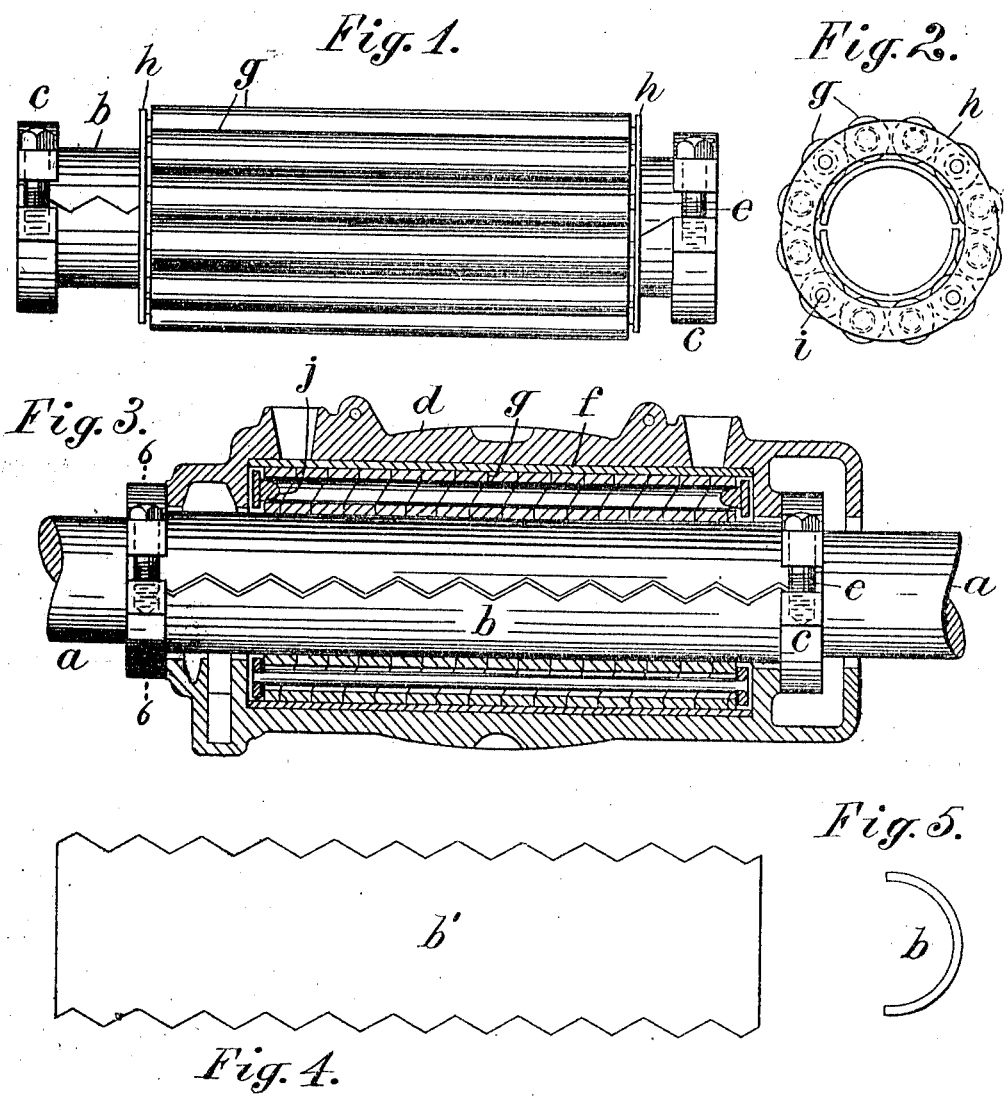

C. I. SHIRLEY & C. S. LOCKWOOD.
JOURNAL SLEEVE FOR ROLLER BEARINGS.
APPLICATION FILED JUNE 27, 1908.

964,322.

Patented July 12, 1910.

UNITED STATES PATENT OFFICE.

CEPHAS I. SHIRLEY AND CHARLES S. LOCKWOOD, OF NEWARK, NEW JERSEY, ASSIGNORS TO HYATT ROLLER BEARING COMPANY, OF HARRISON, NEW JERSEY, A CORPORATION OF NEW JERSEY.

JOURNAL-SLEEVE FOR ROLLER-BEARINGS.

964,322. Specification of Letters Patent. Patented July 12, 1910.

Application filed June 27, 1908. Serial No. 440,612.

*To all whom it may concern:*

Be it known that we, CEPHAS I. SHIRLEY, residing at 114 Stone street, Newark, Essex county, New Jersey, and CHARLES S. LOCK-WOOD, residing at 289 Market street, Newark, Essex county, New Jersey, both citizens of the United States, have invented certain new and useful Improvements in Journal-Sleeves for Roller-Bearings, fully described and represented in the following specification and the accompanying drawings, forming a part of the same.

The object of this invention is to furnish an improved means of securing a working surface upon an axle or journal where the anti-friction rolls of a roller-bearing operate thereon.

Solid sleeves have heretofore been slipped upon an axle to form such a wearing surface, and divided sleeves have also been formed in sections embracing each more than one-half the circumference of the axle and each part made with a lateral opening of less width than the diameter of the axle so that it could be sprung upon the axle and held in its place by its elastic grip thereon.

The present invention relates to a particular construction for securing the halves of a divided sleeve upon an axle by separate clamps, and also in a new article of manufacture in which the parts of a divided sleeve are secured together with a set of anti-friction rolls, to facilitate transportation; the whole forming a unit which can be readily transported and sold, for application to a suitable axle and casing.

The divided sleeve in the present invention is formed with a zigzag joint and is made of rolled sheet-metal sections each embracing no more than one-half of the axle, the ends of the sections projecting beyond the ends of the anti-friction rolls with which they are used, and divided collars are clamped upon such projecting ends which serve three purposes: first, to hold the sections together while in transportation; second, to hold a set of anti-friction rolls in place upon the sleeve during transportation; and, third, when the sections are applied to the axle to clamp the sleeve sections thereon outside the ends of the casing in which the rolls operate. The clamping pressure of the collars produces sufficient friction between the sleeve and axle to hold it in place.

It is common to sell a set of rolls for a roller-bearing, connected together by some species of cage, in readiness to insert within the casing of the bearing, and the present invention furnishes, in addition to such a cage of rolls, a divided sleeve fitted within the cage and provided with means for clamping it upon the axle. This new article of manufacture, therefore, furnishes not only the rolls for a roller-bearing, but the means to form a working surface upon the axle to sustain the wear of the rolls.

Figure 7:
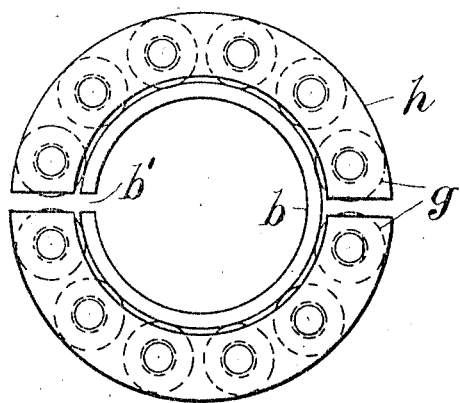

In the drawing, Figure 1 represents such an article of manufacture in side elevation; Fig. 2 an end view of the same with the collar sections upon the sleeve omitted to show the cage of rolls more clearly; Fig. 3 is a longitudinal section, where hatched, at the center line of a roller-bearing casing for a hanger-box; Fig. 4 shows the blank for one of the sleeve-sections, in flat form; and Fig. 5 shows the same rolled into semi-cylindrical shape. Fig. 6 is a section, where hatched, on line 6—6 in Fig. 3. Fig. 7 is an end view like Fig. 2, with the rings $h$ divided to facilitate application to the axle.

In Fig. 3, $a$ designates an axle, upon which sleeve-sections $b$ are shown secured by divided collar sections $c$, the collars being close to the outer ends of the roller-bearing casing $d$. The collar sections are joined by bolts $e$, by which they can pinch or clamp the sleeve-sections tightly upon the axle. The casing is shown formed with a sheet-metal lining $f$ and the rolls $g$ are shown of the spirally wound tubular type and fitted between the sleeve $b$ and lining $f$. Rings $h$, which are more clearly shown in Figs. 1 and 2, are provided at the ends of the rolls and connected together in any suitable manner to hold the rolls in a unitary structure. Such rings may be divided like the sleeve to facilitate application to the axle, as shown in Fig. 7, or made, as shown in Figs. 1 and 2, of circular form.

In Fig. 2, four tie-bars $i$ are shown extended through the interior of four rolls and the ends riveted into the rings $h$, as shown in the lower part of Fig. 3, to hold the rings together. Twelve rolls are shown in the set in Figs. 1 and 2, and the remaining eight rolls are held between the rings by studs $j$ projected from the rings into the ends of such rolls.

It is common to prevent the entire length of the roll from rolling across the joint of the sleeve-sections at once, by making the joint oblique; and this invention furnishes an improved construction for such a joint, which particularly adapts the edges to engage one another when clamped together for transportation without any axle, and with the cage of rolls secured about the sleeve. The sleeve is commonly made of thin sheet-metal, and the edges are adapted to retain engagement with one another by forming them with numerous sloping projections and indentations which form a zigzag joint. Such sleeve-sections are formed from a sheet-metal blank $b'$ represented in Fig. 4, the opposite edges of the blank being complemental to one another so that a single blank can be used for both of the sections. When two of such blanks are rolled into semi-cylindrical form, as shown in Fig. 5, a cylindrical sleeve is formed of such sections, the edges of which may interlock when they are clamped together without the axle, and the edges of which form oblique joints, when clamped upon an axle, over which the rolls may move smoothly.

Our construction is particularly useful in the transportation of the cage and sleeve-sections conjointly, as represented in Fig. 1, in which the clamping of the collars brings the edges of the sleeve-sections into contact, and the cage of rolls secured outside of the sleeve is held in place upon the sleeve during transportation, by the collars at its opposite ends. The sleeve-sections are, of course, brought a little closer together when thus clamped without the axle than when fitted to an axle within the casing of the roller bearing; but the zigzag edges and the rolls in the encircling cage hold the sleeve-sections in alinement while the collars clamp them firmly together, and the whole is thus fitted for transportation as a unitary article of manufacture. To form such a unitary article of manufacture, the sleeve requires to be made longer than the cage containing the anti-friction rolls and projected beyond the ends of the cage to permit the application of the clamping means.

Where the end of the shaft is accessible for applying the sleeve in a unitary form, it is obvious that the sleeve may be divided at one side only, as shown in Fig. 7, and rolled of such diameter as to slip readily upon the shaft from the end thereof and afterward secured thereon by the clamping pressure of the collars, which would press the sides opposite to the joint in close contact with the axle. The sleeve in such case would be made of suitable length to apply the clamping collars outside the ends of the casing, and would serve also to carry the set of rolls, as shown in Fig. 1, for transportation with the sleeve as a unit.

We disclaim the mere use of a sleeve to form a wearing surface upon an axle, and the use of a divided sleeve having sections with a lateral opening of less width than the diameter of the shaft and held in place thereon exclusively by their own elasticity. We also disclaim the use of a divided sleeve when used as a coupling upon shafts having a polygonal cross section by which the halves of the sleeve are engaged positively with the shaft so as to rotate the same.

The sleeve is not used as a coupling in our invention, but solely to form a wearing surface, and is formed with a cylindrical bore and fitted to a cylindrical axle, and merely held in place thereon by the friction of the clamping collar.

Having thus set forth the nature of the invention what is claimed herein is:

1. A roller bearing having a casing with an annular recess and a set of anti-friction rolls therein, a cylindrical axle extended within and beyond the ends of the rolls, a divided sleeve having a cylindrical bore fitted to the axle to form a bearing surface for the rolls and its ends projected beyond the ends of the rolls, collar-sections in halves fitted upon the sleeve-sections in contact with the ends of the casing and means for clamping the collar-sections together to perform the double function of securing the divided sleeve by mere friction upon the axle and of holding the axle from longitudinal movement when rotated within the casing.

2. As a new and unitary article of manufacture, a sleeve divided into longitudinal sections, the edges of the sections having numerous sloping indentations and projections forming a zigzag joint, a cage with a set of anti-friction rolls fitted upon such sleeve, and divided collars clamped upon the ends of the sleeve sections beyond the ends of the cage, the collars serving to perform one function by clamping the sections together with the zigzag edges in contact when in transportation, and while holding the cage upon the sleeve, and also adapted to perform another function when the sleeves and rolls are in use by bearing against the ends of the roller bearing casing to resist end thrust.

3. A roller bearing having a casing with an annular recess and a set of anti-friction rolls therein, a cylindrical axle extended within and beyond the ends of the rolls, a divided sleeve having a cylindrical bore fitted to the axle to form a bearing surface for the rolls and its ends projected beyond the ends of the rolls, collar-sections in halves fitted upon the sleeve-sections, adjacent the ends of the casing and means for clamping the collar-sections together to perform the double function of securing the divided sleeve by mere friction upon the axle and of holding the axle from longitudinal movement when rotated within the casing.

In testimony whereof we have hereunto set our hands in the presence of two subscribing witnesses.

CEPHAS I. SHIRLEY.
CHARLES S. LOCKWOOD.

Witnesses:
S. CONN,
R. S. RICHARDSON.